July 15, 1969 W. SCHMITT 3,455,543
METALLURGICAL FURNACE
Filed Jan. 20, 1967 4 Sheets-Sheet 2
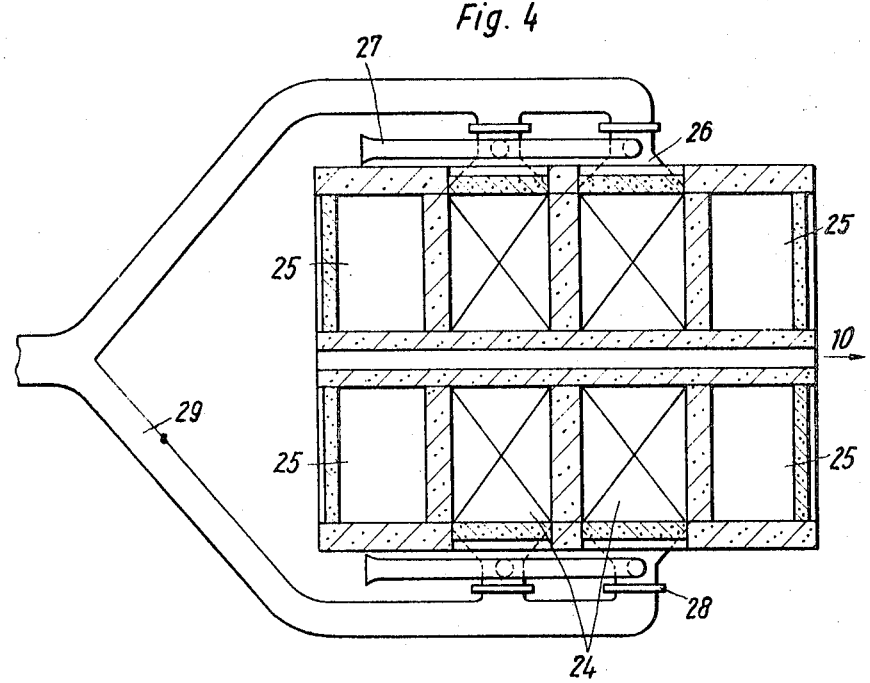
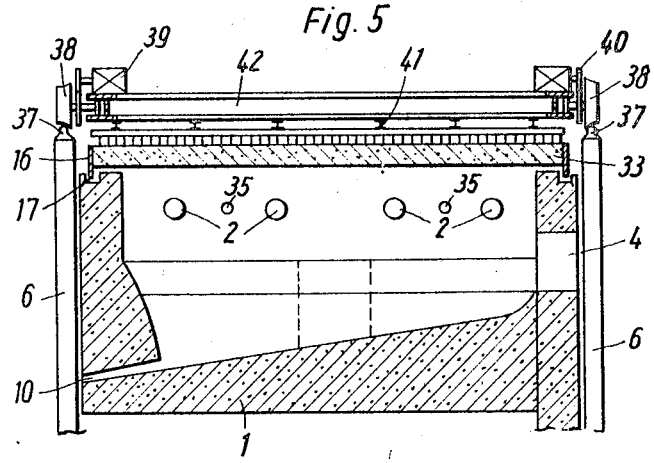
Inventor:
WILHELM SCHMITT
BY: Burgess, Dinklage & Sprung
ATTORNEYS Inventor:
WILHELM SCHMITT
BY:
ATTORNEYS July 15, 1969 W. SCHMITT 3,455,543
METALLURGICAL FURNACE
Filed Jan. 20, 1967 4 Sheets-Sheet 4

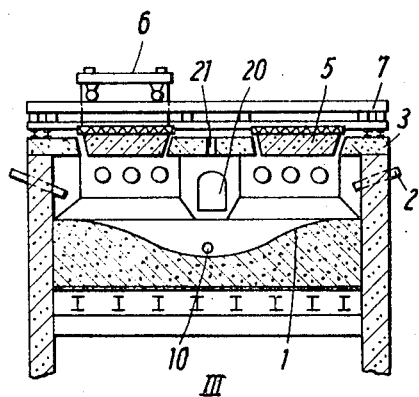
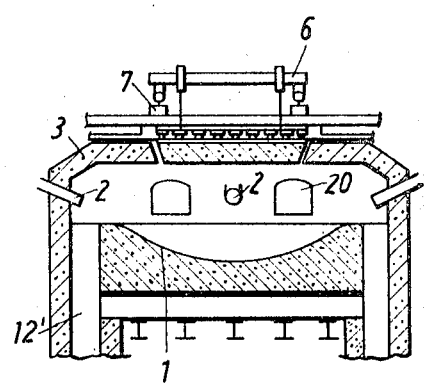
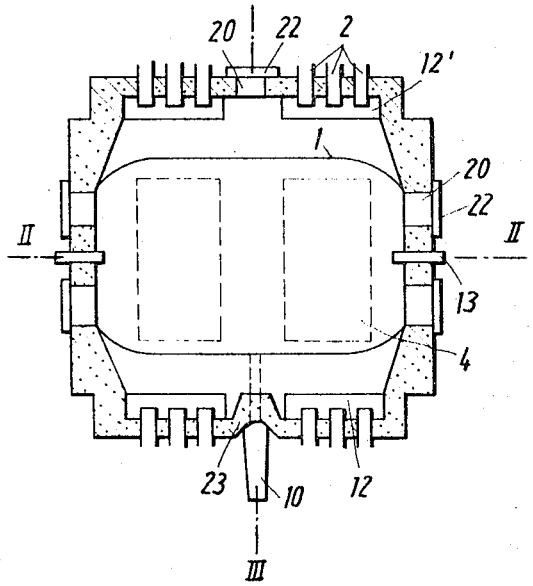

Inventor:
WILHELM SCHMITT
BY: Burgess, Dinklage & Sprung
ATTORNEYS

United States Patent Office 3,455,543
Patented July 15, 1969

3,455,543
METALLURGICAL FURNACE
Wilhelm Schmitt, 70 Siedweg, Moers, Germany
Filed Jan. 20, 1967, Ser. No. 610,680
Claims priority, application Germany, Jan. 28, 1966,
Sch 38,398
Int. Cl. F27b 3/02, 3/22
U.S. Cl. 263—15    9 Claims

ABSTRACT OF THE DISCLOSURE

A reverberatory metallurgical furnace, substantially rectangular in shape, having a burner system along at least one side of the breadth thereof, which furnace has a breadth of at least 4 metres and a ratio of length to breadth of about 2:1 to 1:4, wherein the burner system comprises a plurality of relatively spaced individual burner assemblies, each of which provides a substantially independent flame, which flames and burner assemblies are so positioned as to affect substantially the whole area of said furnace, including the longitudinal edges thereof.

---

Figure 6:
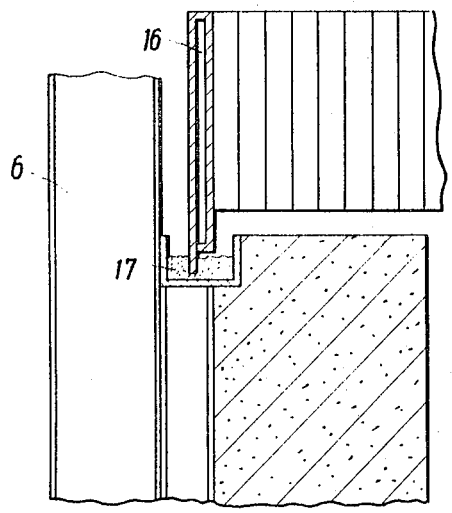

This invention relates to a metallurgical reverbatory furnace comprising a substantially rectangular hearth covered by a low roof and heated from one or both ends.

The best known reverberatory furnaces are the open hearth furnaces used for the production of steel. Their particular importance for the production of steel largely derives from their suitability for melting down scrap and other solid charge materials as well as for performing metallurgical reactions which proceed in the melt.

The technological and economic development of these furnaces has already reached a level of perfection that would appear to preclude the possibility of further improvement.

However, the increasing volumes of scrap which now become available and with which pneumatic processes are also unable to cope have created a problem which for its solution demands that the charge capacity of such a furnace, particularly for melting down scrap, should be increased, that the process as such should be further simplified and that the time required for each heat should be reduced in order to raise the overall performance as well as the economic efficiency of the furnace. For achieving these objects considerable modification of conventional furnaces is unavoidable.

The present invention provides a metallurgical reverberatory furnace with a hearth which substantially exceeds conventional furnaces in breadth.

Whereas the ratio of length to breadth of the hearth of a conventional open hearth or like reverberatory furnace is generally in the region of 3:1, the length of the hearth being understood to mean the distance from flame ramp to flame ramp, this ratio in a furnace according to the present invention is substantially less. It does not exceed 2.5:1 and will generally be between 2:1 and 1:4, preferably between 1.5:1 and 1:2.

It is proposed that the actual breadth of the hearth should not be less than 4 metres. However, a workable furnace would not yet be obtained by merely widening its hearth.

Besides widening the hearth the invention also proposes to provide a burner system on at least one of the lateral sides of the hearth in such manner that the flames of these burners will uniformly sweep the surface of the bath into the region of its longitudinal edges. Preferably this burner system may be divided into a plurality of relatively spaced burner assemblies which provide a corresponding number of relatively substantially independent flames. Each burner assembly may be associated with one or more admissions for fuel and with means for the admission of air, oxygen or an air-oxygen mixture. The air admission means are likewise preferably subdivided to supply each burner assembly with a controlled volume of combustion air. Nevertheless, if desired, a single air admission may be provided to supply air to several assemblies. However, the burner assemblies must generally be so arranged and their burners so disposed that the flames will also impinge on the surface of the bath in the region of the longitudinal edges of the hearth. Generally speaking, the increase in the breadth of the hearth will be so great that the furnace must be charged from above. Consequently a furnace according to the invention may be provided with one or more closable openings for charging the same from overhead. For the purpose of creating such openings for charging it is preferred to provide a roof which as a unit or in sections is movable. If several charging openings are to be provided these are preferably located above the region swept by the burner flames. The larger the charging opening the more easily can such a furnace be charged with the aid of charging baskets and like charging means.

The roof of the furnace which may be movable as a unit or in sections may be so contrived that it is suspended from a torsionally and flexurally rigid structure movable on wheels which run on a track formed on the steel framework of the furnace. Conveniently, seals between the longitudinal sides of the roof and the furnace may be formed by skirtings immersed in sand-filled troughs or by like means on the outer protected sides of the furnace walls. Since the refractory lining of such a roof can be seamless, particularly exposed points of wear are absent. The track wheels of the suspended roof, preferably associated with lateral guide rollers, ride on rails supported exclusively by the steel framework which is not affected by the furnace as such. The suspension system of the roof and its suspending structure therefore continuously carry the same unchanged load and racking or bending strains do not arise since the roof need not be lifted or lowered. If desired, the suspended roof may be divided into two halves, each separately movable on the longitudinal track.

In order to avoid exposing the refractory lining of the roof to abrupt temperature changes when the roof is withdrawn, a horizontal plate may be provided below the level of the movable roof outside the contours of the hearth or furnace, said plate carrying a protective layer of sand or other refractory material and containing burner jets for heating the exposed underside of the open part of the roof. The presence of the plate simultaneously shields the working level below the plate from the heat radiated by the opened end of the suspended roof. The shielded space can thus be used for storage or other purposes.

Figure 7:
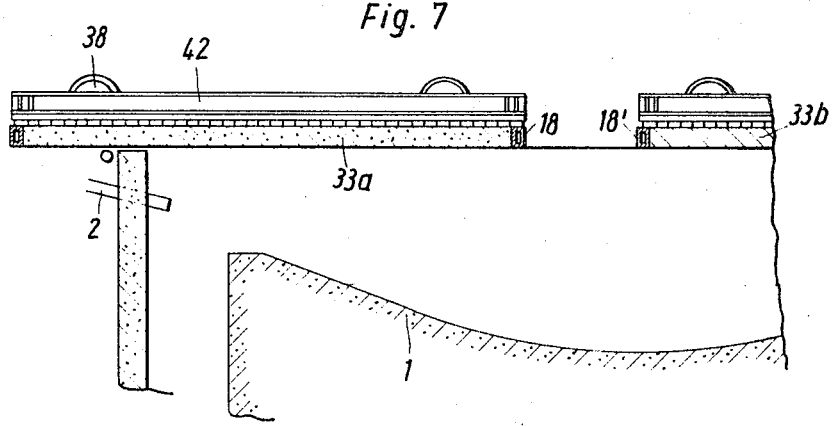
Figure 8:
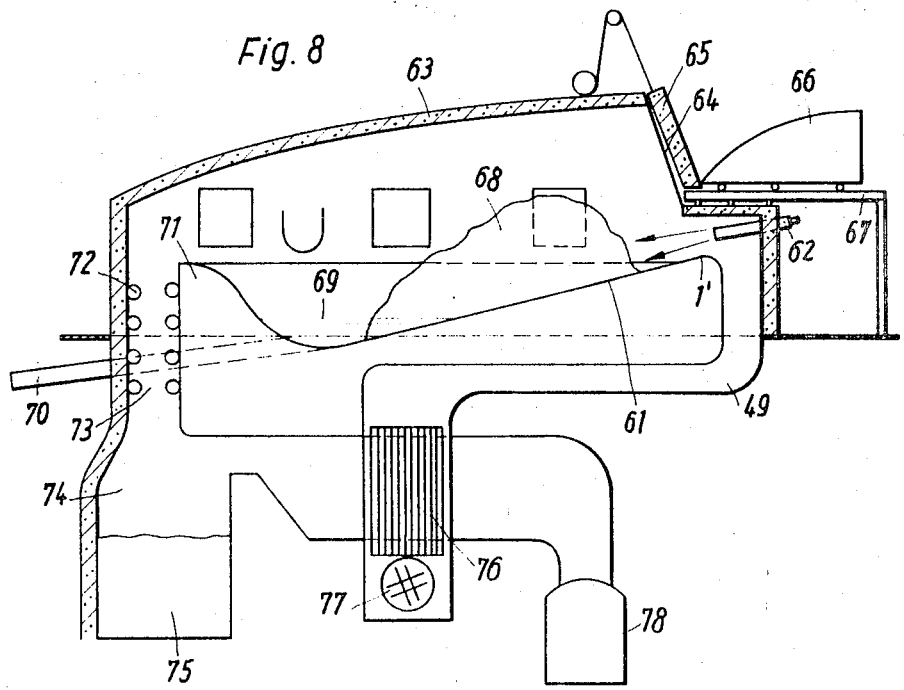
Figure 9:
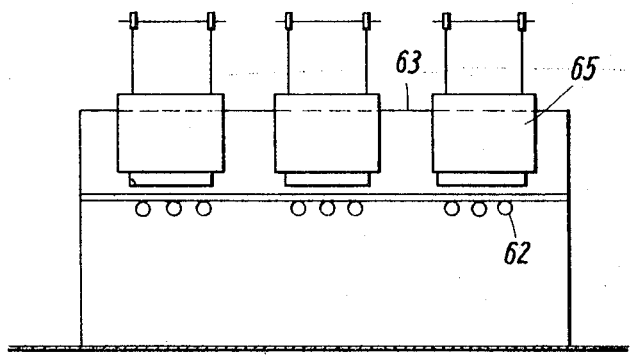

In order that the nature of the invention may be more readily understood, illustrative embodiments thereof will be hereinafter described by reference to the accompanying drawings in which FIGURE 1 is a part sectional plan view of the hearth and roof of a reverberatory furnace according to the invention, FIGURE 2 is a longitudinal section of the furnace taken on the line II—II in FIGURE 1, FIGURE 3 is a cross section taken on the line III—III in FIGURE 1, FIGURE 4 is a horizontal section of the part of the furnace under the hearth, FIGURE 5 is a cross section of an embodiment of the proposed furnace provided with a movable roof, FIGURE 6 illustrates the general disposition of a sand seal provided between a furnace wall and a movable suspended roof, FIGURE 7 is a longitudinal section of a furnace with a suspended roof divided into two parts, FIGURE 8 is a longitudinal section of an embodiment in the form of a reverberatory furnace associated with a recuperator, and FIGURE 9 is a schematic front elevation of a furnace according to FIG. 8.

In FIGS. 1, 2 and 3 which in plan, cross section and longitudinal section respectively represent the hearth and roof portion of an open hearth furnace according to the invention, burner assemblies 2 are provided on each of the lateral sides of the hearth and adapted to be operated alternately. Below each burner assembly 2 a flue 12 descends to the bottom part of the furnace under the hearth. The roof 3 contains wide aperture charging openings 4. The projection of these openings in the plane of the hearth is indicated by chain line rectangles in FIG. 1. The charging openings 4 are closable by cover plates 5 which can be manipulated by travelling hoisting gear 6 running on rail girders 7. In closed position the weight of the covers which have refractory linings is taken by a steel structure not shown in the drawings, so that the roof 3 does not carry this weight. The tap hole 10 is located centrally on one side of the width of the hearth. At this point the wall 23 of the furnace between the two flues 12 is drawn inwards. Adjacent the narrower sides of the hearth supplementary burners 13 are provided which assist in melting the charge, and which may be exclusively used during refining. Furthermore, the interior of the hearth is accessible for repairs and the like through openings 20 closed by doors 22. The division of the burner assemblies and the disposition of the regenerators under the hearth, which will be readily understood from FIG. 1, permit the furnace to be operated to suit any particular purpose that may be desired. The ingress of cold or secondary air during the temporary removal of the charging covers 5 can be prevented by simultaneously operating all the burners, at least the burners on opposite sides of the area above which the cover 5 is to be removed, and by blowing in air through the regenerators from below.

FIGURE 4 is a plan view illustrating the disposition of the regenerators in a manner suitable for combination with the hearth illustrated in FIGS. 1, 2 and 3. The checkerbrick regenerators 24 are placed side by side under the hearth 1. Since each regenerator is only about half as wide as the hearth 1 sufficient space remains for the accommodation of the preceding slag pockets 25 alongside each checkerbrick regenerator 24 in the crosswise direction without creating an obstruction that would impede operations below the tap hole 10 of the furnace. As is clearly shown in FIG. 4 fantails 26 which are connected to cold air intakes 27 are fitted at the bottom of the checkerbrick regenerators and provided with dampers 28 for shutting them off from flues 29 which lead to the stack. The dampers and air intakes 27 associated with the regenerators, as described, can be individually opened and closed in respect of each regenerator to permit the hearth to be operated in the most suitable way.

FIG. 5 is a cross section of a hearth according to the invention in the plane of the tap hole, but in this embodiment, contrary to FIGS. 1 to 3, the breadth of the furnace is less than its length. The bottom of the hearth 1 slopes towards the tap hole, as is conventional. Two burner assemblies 35 can be seen in the facing wall of the furnace, each burner assembly being associated with a separate flue. Protected on the ouside of the furnace walls sand trough seals 17 are provided. Skirtings attached to water-cooled side plates 16 and extending along the roof edges in the direction in which the roof can be moved dip into the trough containing the sand. Gear transmissions 40 are interposed between the wheels 38 of the roof, which run on rails 37, and the motors 39 provided for driving the wheels. The hangers 41 from which the roof 33 is suspended are rigidly attached to the main suspending framing 42.

FIG. 7 is an embodiment of a furnace in which the suspended roof comprises two halves 33a and 33b which are each independently movable. This arrangement has the advantage that by withdrawing the halves relatively short distances an opening for charging can be uncovered above the hearth centre which could not otherwise be uncovered except by the complete withdrawal of an integrally constructed suspended roof.

The furnace illustrated in FIG. 8 comprises a hearth 61 of suitable cross section for heating the same by several burner assemblies 62 on one of the lateral sides of the hearth. Above the burner assemblies 62 is a charging opening 64 which cuts obliquely into the arched roof from above. This opening is closable by a sliding door 65, which can be lowered over the opening. Level with the bottom edge of the opening is a charging platform 67 upon which a large capacity charging box 66 is shown to have been deposited. This box has a drop floor which is not shown in the drawing, but which can be released by the charging machine when the box has been advanced through the door. The scrap will therefore drop into the furnace in a heap 68 directly in front of the burner assembly 62. As the metal gradually melts a pool 69 will collect in the hearth where it is deepest. Fresh scrap can thus be charged into the furnace without intermission until the furnace is full. The molten metal is tapped in conventional manner through the tap hole 70. Facing the burner assembly on the other side of the hearth the latter is formed with a flame ramp 71 behind which is a downtake 73 into a slag pocket 74 in which the entrained slag 75 collects. From the slag pocket 74 the exhaust gases are taken through a recuperator 76 to an exhaust gas flue 78. The cold air draught induced by a fan 47 is preheated in the recuperator 76 and enters the furnace chamber through an uptake 49. This air may be enriched with oxygen obtained by using the heat recovered from the exhaust gas.

FIG. 9 is a front elevation of the same furnace and illustrates that several units comprising burner assemblies and air heater assemblies under the hearth can be combined, so that the breadth of the furnace may in practice be increased as much as desired.

A few of the many advantages afforded by furnaces according to the invention may here be specially noted:

A furnace comprising the features of the present invention is capable of handling a much larger charge than a conventional open hearth furnace, and its maximum charge handling capacity can be fully utilised for processing a scrap requiring minimum preparation.

The burner system, preferably in the form of at least two burner assemblies located side by side, heats a much wider hearth than that provided in a conventional open hearth furnace. The hearth may usually be so wide that the normal charging facilities available in an open hearth steel making plant will be insufficient to service the hearth. However, owing to its great breadth the furnace offers the best possible facilities for charging the same with baskets through openings in the furnace roof. Contrary to the limitations imposed by conventional forms of furnace design, a practically unlimited volume of scrap can be charged into the proposed furnace because it is not subjected to the spatial restrictions of a conventional furnace.

The extra-wide hearth in conjunction with the widened burner system has the further decisive advantage that the quantity of heat required for melting can be more effectively supplied by a less sluggish flame and that the charge, being spread in a thin layer offering a much larger surface to the flame, is capable of accepting this heat much more rapidly.

The widening of the flame area brought about more particularly by the simultaneous operation of a plurality of burners also has the advantage of significantly reducing the necessary period of boil. The widening and/or multiplication of the intensive reaction zones in the areas in which the flames impinge on the bath brings about a nearly proportional acceleration of the fining rate and of the rate of temperature rise of the bath, and the duration of the heats can thus be greatly curtailed. The higher burning rate due to the better distribution of the fuel also lengthens the life of the entire furnace. A particularly efficient furnace suitable for handling maximum charge volumes has a hearth in which the ratio of length to breadth is less than 1:1 and its burners system is widened correspondingly.

It is another advantage of the invention that it can be applied to reverberatory furnaces of very diverse kinds. Open hearth steel making furnaces with a regenerative air heating system, with or without the employment of oxygen, may be constructed according to the invention as well as reverberatory furnaces which lack a regenerative system and instead use a recuperator, or reverberatory furnaces heated with fuel and oxygen flames.

What is claimed is:

1. A substantially rectangular metallurgical furnace, having a breadth of at least 4 metres and a length to breadth ratio of about 2:1 to 1:4, having a low roof, and having a burner system comprising a plurality of spaced, individual burner assemblies, each of which burner assemblies is adapted to provide an independent flame, which burner system is disposed on at least one lateral side of said furnace and is so positioned to be effective over the entire furnace, including the longitudinal edge thereof; wherein when said burner assemblies are provided on both lateral sides they are adapted to operate alternatively with the burners of one lateral side operating at a time.

2. A metallurgical furnace as defined in claim 1, comprising a system of burners on both sides of the breadth of said hearth.

3. A metallurgical reverberatory furnace as defined in claim 1, wherein the ratio of the length to the breadth of said hearth is between 1.5:1 and 1:2.

4. A metallurgical furnace as defined in claim 2, wherein said burners on opposite sides of the breadth of said hearth are operated alternately and flues separated by flame ramps from the bath in said hearth descend to slag pockets and regenerative air heaters situated under said hearth, and said regenerative air heaters are each connected to duct means incorporating control and two-way valve fittings for connecting said duct means either to an exhaust gas duct or to a force air intake for the admission of cold air.

5. A metallurgical furnace as defined in claim 4, wherein said hearth is covered by a suspension type roof which is movable to uncover an opening for charging said hearth.

6. A reverberatory furnace as defined in claim 5, wherein said roof is divided into independently movable parts.

7. A reverberatory furnace as defined in claim 4, comprising a movable suspension-type roof attached to a torsionally and flexurally rigid frame structure mounted on wheels adapted to run on a track on the steel furnace framework and so disposed that the roof can be moved on said track to uncover a charging opening of sufficient width to permit said hearth to be charged overhead from a charging basket.

8. A reverberatory furnace as defined in claim 7, wherein said suspension-type roof is provided along its lateral edges with water-cooled plates carrying skirtings which on the outsides of the walls of said furnace form seals by dipping into cooperating sand-filled troughs.

9. A reverberatory furnace as defined in claim 5, wherein said hearth is covered by a stationary roof containing at least one charging opening closable by a liftable cover plate.

References Cited

UNITED STATES PATENTS

| | | | |
|---|---|---|---|
| 1,941,410 | 12/1933 | Mulholland | 263—15 X |
| 2,004,916 | 6/1935 | Fitch | 263—15 |
| 2,288,491 | 6/1942 | Seil | 263—15 |
| 2,386,565 | 10/1945 | Nissim. | |
| 3,129,930 | 4/1964 | Labat-Camy | 263—15 |
| 3,182,985 | 5/1965 | Obenchain | 263—15 X |

JOHN J. CAMBY, Primary Examiner

U.S. Cl. X.R.

266—33